United States Patent
Basu et al.

(10) Patent No.: US 11,397,657 B1
(45) Date of Patent: Jul. 26, 2022

(54) MANAGING MEMORY OBJECTS THAT ARE ASSIGNED A RESPECTIVE DESIGNATION

(71) Applicant: Micron Technology, Inc., Boise, ID (US)

(72) Inventors: Reshmi Basu, Boise, ID (US); Richard C. Murphy, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/143,481

(22) Filed: Jan. 7, 2021

(51) Int. Cl.
*G06F 11/30* (2006.01)
*G06F 11/34* (2006.01)
*G06F 13/16* (2006.01)
*G06F 11/10* (2006.01)
*G06F 3/06* (2006.01)

(52) U.S. Cl.
CPC ........ *G06F 11/3037* (2013.01); *G06F 3/0616* (2013.01); *G06F 3/0653* (2013.01); *G06F 3/0688* (2013.01); *G06F 11/1068* (2013.01); *G06F 11/1076* (2013.01); *G06F 11/3409* (2013.01); *G06F 13/1668* (2013.01)

(58) Field of Classification Search
CPC .... G06F 3/0616; G06F 3/0653; G06F 3/0688; G06F 11/1068; G06F 11/1076; G06F 11/3037; G06F 11/3409; G06F 13/1668
See application file for complete search history.

(56) References Cited

U.S. PATENT DOCUMENTS

| | | | |
|---|---|---|---|
| 8,909,861 B2 | 12/2014 | Kirshenbaum et al. | |
| 9,601,193 B1 | 3/2017 | Zeng et al. | |
| 9,898,224 B1* | 2/2018 | Marshak | G06F 3/0647 |
| 2006/0026379 A1 | 2/2006 | Jung | |
| 2013/0036286 A1* | 2/2013 | Jin | G06F 3/067 |
| | | | 711/170 |
| 2015/0154066 A1* | 6/2015 | Grimsrud | G06F 11/108 |
| | | | 714/764 |
| 2015/0155048 A1 | 6/2015 | Jeong et al. | |
| 2015/0277802 A1* | 10/2015 | Oikarinen | G06F 3/0689 |
| | | | 711/114 |
| 2016/0085625 A1* | 3/2016 | Amato | G06F 11/00 |
| | | | 714/766 |

* cited by examiner

*Primary Examiner* — Larry T Mackall
(74) *Attorney, Agent, or Firm* — Brooks, Cameron & Huebsch, PLLC

(57) ABSTRACT

Systems, apparatuses, and methods related to managing memory objects are discussed. An example method can include monitoring a first characteristic set for each of a plurality of memory objects written to a first memory device or a second memory device; monitoring a second characteristic set for each of the plurality of memory objects; monitoring a performance characteristic set for the first memory device and the second memory device, wherein the first memory device and the second memory device comprise different types of memory media; and writing each of the plurality of memory objects in a particular respective location of the first memory device or the second memory device based, at least in part, upon the first characteristic set, the second characteristic set, and the performance characteristic set.

19 Claims, 4 Drawing Sheets

MANAGING MEMORY OBJECTS THAT ARE ASSIGNED A RESPECTIVE DESIGNATION

TECHNICAL FIELD

The present disclosure relates generally to memory objects, and more particularly, to apparatuses, systems, and methods for managing memory objects.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, ferroelectric random access memory (FeRAM), and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system.

DETAILED DESCRIPTION

Figure 1:
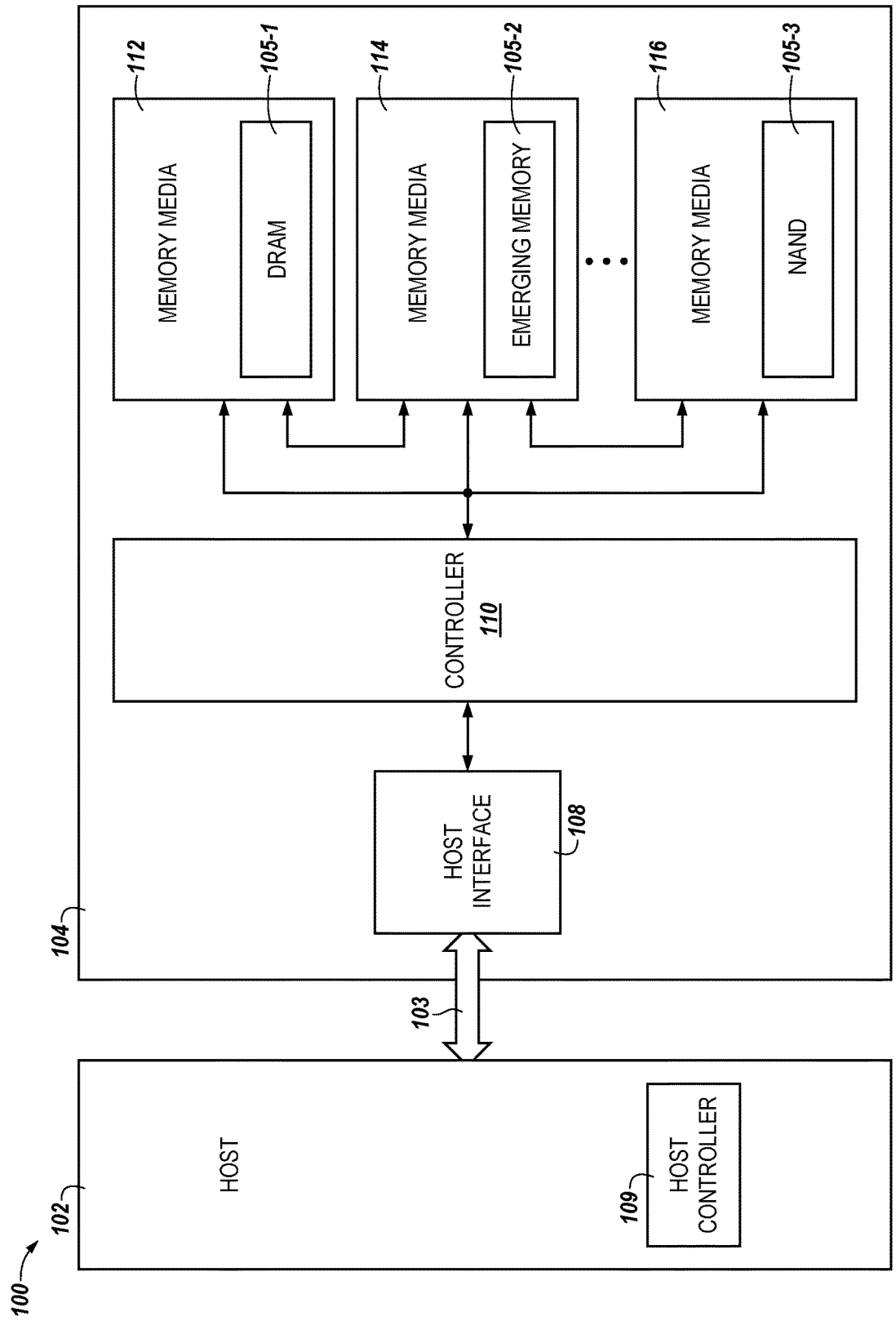
FIG. 1 is a block diagram in the form of a computing system including a controller and memory devices in accordance with a number of embodiments of the present disclosure.

Systems, apparatuses, and methods related to managing memory objects are described. In some embodiments, memory objects that are written to a first memory device or a second memory device can be monitored. For instance, a first characteristic set, e.g., including a number of short term characteristics, and a second characteristic set, e.g., including a number of long term characteristics, may be monitored for each of these memory devices. Further, a performance characteristic set for the first memory device and the second memory device may be monitored. Based, at least in part, upon the first characteristic set, the second characteristic set, and the performance characteristic set each of the memory objects may be written to a particular respective location of the first memory device or the second memory device. Writing the memory objects to the particular respective location of the first memory device or the second memory device based, at least in part upon the first characteristic set, the second characteristic set, and the performance characteristic set, can help provide that memory objects that are more frequent accessed may be written to memory locations that are relatively faster and/or relatively more reliable, as compared to other memory locations of the first memory device and the second memory device. Additionally, writing the memory objects to the particular respective location of the first memory device or the second memory device based, at least in part upon the first characteristic set, the second characteristic set, and the performance characteristic set, can help provide that memory objects that are less frequent accessed may be written to memory locations that are relatively slower and/or relatively less reliable, as compared to other memory locations of the first memory device and the second memory device.

As described in more detail herein, each of the plurality of memory objects may be assigned a respective designation based, at least in part, upon the first characteristic set and the second characteristic set. One or more embodiments provide that the respective designations are selected from a first designation, a second designation, a third designation, and a fourth designation, e.g., to provide four states. As an example, a memory object having the first designation may be more frequently accessed, e.g., during a short term interval and/or during a long term interval, than a memory object having the second designation, the third designation, or the fourth designation. Similarly, a memory object having the second designation may be more frequently accessed, e.g., during a short term interval and/or during a long term interval, than a memory object having the third designation or the fourth designation. Embodiments provide that memory objects may change designations over time. For instance, two memory objects having the first designation may be combined to form a third memory object have second designation. Similarly, a memory object having the second memory designation may be separated into two memory objects, each having the first designation. As used herein, "memory object" refers to data that can be written to and/or read from a memory device. For instance, a memory object can refer to a contiguously addressed region of data that is uniquely identified on a device and can be read or written. As used herein, "managing memory objects' refers to one or more operations, e.g., monitoring a characteristic set, monitoring a performance characteristic set, and writing the memory objects in a particular respective location, among other operations discussed herein.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

It is to be understood that the terminology used herein is for the purpose of describing particular embodiments only, and is not intended to be limiting. As used herein, the singular forms "a," "an," and "the" can include both singular and plural referents, unless the context clearly dictates otherwise. In addition, "a number of," "at least one," and "one or more", e.g., a number of memory banks, can refer to one or more memory banks, whereas a "plurality of" is intended to refer to more than one of such things.

Furthermore, the words "can" and "may" are used throughout this application in a permissive sense, e.g., having the potential to, being able to, not in a mandatory sense, e.g., must. The term "include," and derivations thereof, means "including, but not limited to." The terms "coupled" and "coupling" mean to be directly or indirectly connected physically or for access to and movement (transmission) of commands and/or data, as appropriate to the context.

The figures herein follow a numbering convention in which the first digit or digits correspond to the figure number and the remaining digits identify an element or component in the figure. Similar elements or components between different figures may be identified by the use of similar digits. For example, 110 may reference element "10" in FIG. 1, and a similar element may be referenced as 210 in FIG. 2. A group or plurality of similar elements or components may generally be referred to herein with a single element number. For example, a plurality of reference elements 130-1 to 130-N may be referred to generally as 130. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

FIG. 1 is a block diagram in the form of a computing system 100 including an apparatus including a memory system 104 in accordance with a number of embodiments of the present disclosure. As used herein, an "apparatus" can refer to, but is not limited to, any of a variety of structures or combinations of structures, such as a circuit or circuitry, a die or dice, a module or modules, a device or devices, or a system or systems, for example. The memory system 104 can include a host interface 108, a controller 110, e.g., a processor, control circuitry, hardware, firmware, and/or software, and a number of memory media devices. Memory system 104 can be located a location that is remote, e.g., part of a cloud database, from a host and/or from a location of a user that is accessing the memory system 104.

The host 102 can be a host system such as a personal laptop computer, a vehicle, a desktop computer, a digital camera, a mobile telephone, an internet-of-things (IoT) enabled device, or a memory card reader, graphics processing unit, e.g., a video card, among various other types of hosts. The host 102 can include a system motherboard and/or backplane and can include a number of memory access devices such as a number of processing resources, e.g., one or more processors, microprocessors, image processor, and/or some other type of controlling circuitry. One of ordinary skill in the art will appreciate that "a processor" can intend one or more processors, such as a parallel processing system, a number of coprocessors, etc. The host 102 can be coupled to a host interface 108 of the memory system 104 by a communication channel 103.

As used herein an "IoT enabled device" can refer to devices embedded with electronics, software, sensors, actuators, and/or network connectivity which enable such devices to connect to a network and/or exchange data. Examples of IoT enabled devices include mobile phones, smart phones, tablets, phablets, computing devices, implantable devices, vehicles, home appliances, smart home devices, monitoring devices, wearable devices, devices enabling intelligent shopping systems, among other cyber-physical systems.

The host 102 can be responsible for executing an operating system for a computing system 100 that includes the memory system 104. Accordingly, in some embodiments, the host 102 can be responsible for controlling operation of the memory system 104. For example, the host 102 can execute instructions, e.g., in the form of an operating system, that manage the hardware of the computing system 100 such as scheduling tasks, executing applications, controlling peripherals, etc.

A non-limiting example of multiple memory media having various types are described in FIG. 1. For example, as illustrated in FIG. 1, the memory system can include memory media such as memory media 112 including an array of DRAM memory cells 105-1, memory media 114 including an array of Emerging Memory memory cells 105-2, such as resistance variable, e.g., 3-D Crosspoint (3D XP), memory devices, memory devices that include an array of self-selecting memory (SSM) cells, etc., or any combination thereof, and memory media 116 including an array of NAND memory cells 105-3. Resistance variable memory devices can perform bit storage based on a change of bulk resistance, in conjunction with a stackable cross-gridded data access array. Additionally, in contrast to many flash-based memories, resistance variable non-volatile memory can perform a write in-place operation, where a non-volatile memory cell can be programmed without the non-volatile memory cell being previously erased. In contrast to flash-based memories and resistance variable memories, self-selecting memory cells can include memory cells that have a single chalcogenide material that serves as both the switch and storage element for the memory cell.

While three memory media types, e.g., DRAM 105-1, Emerging Memory 105-2, and/or NAND 105-3, are illustrated, embodiments are not so limited, however, and there can be more or less than three memory media types. For instance, a number of embodiments provide that memory media 112 including the array of DRAM memory cells 105-1 and memory media 116 the array of NAND memory cells 105-3 are utilized, e.g., the memory media 114 including the array of 3D XP memory cells 105-2 is not included. As another example, a number of embodiments provide that memory media 114 including the array of Emerging Memory cells 105-2 and memory media 116 the array of NAND memory cells 105-3 are utilized, e.g., memory media 112 including the array of DRAM memory cells 105-1 is not included.

Further, the types of memory media, e.g., types of arrays of memory cells, are not limited to the three specifically illustrated, e.g., DRAM 105-1, Emerging Memory 105-2, and/or NAND 105-3, in FIG. 1, other types of volatile and/or non-volatile memory media types are contemplated. In a number of embodiments, the controller 110, the memory media 112, 114, and 116, and/or the host interface 108 can be physically located on a single die or within a single package, e.g., a managed memory application. Also, in a number of embodiments, a plurality of memory media, e.g., memory media 112, 114, and/or 116, can be included on a single memory system 104. Also, in some embodiments, more than one memory media can include a same type of array of memory cells. For example, instead of memory media 112 having an array of DRAM memory cells and memory media 114 having an array of Emerging Memory cells, both memory media 112 and 114 can have an array of Emerging Memory cells.

Figure 2:
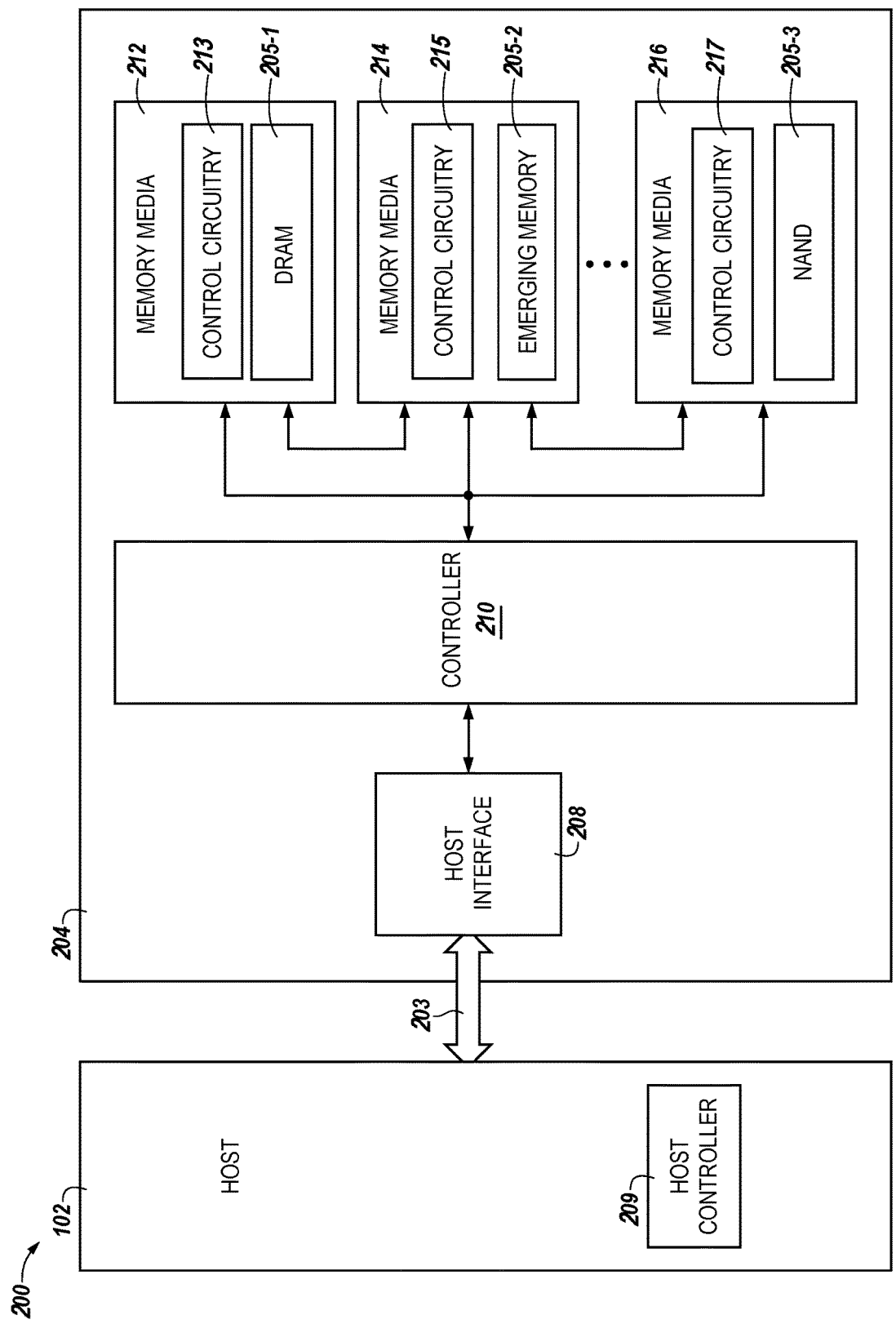
FIG. 2 is a block diagram in the form of a computing system including a controller, control circuitry, and memory devices in accordance with a number of embodiments of the present disclosure.

FIG. 2 is a block diagram in the form of a computing system 201 including multiple memory media types in accordance with a number of embodiments of the present disclosure. FIG. 2 illustrates a computing system 201 which includes a host 202, including a host controller 209 which can be analogous to the host 102 and host controller 109 described in connection with FIG. 1. As shown in FIG. 2, the memory media 212, 214, 216 may each include a respective control circuitry. As shown in FIG. 2, the memory media 212 includes control circuitry 213, the memory media 214 includes control circuitry 215, and the memory media 216 includes control circuitry 217. While each memory media shown in FIG. 2 includes a respective control circuitry 213, 215, 217, embodiments are not limited. For instance, embodiments provide that a number of memory media include the control circuitry, while a number of different memory media do not include the control circuitry. Operations discussed herein may be performed by the controller, the control circuitry, or combinations thereof.

Figure 3:
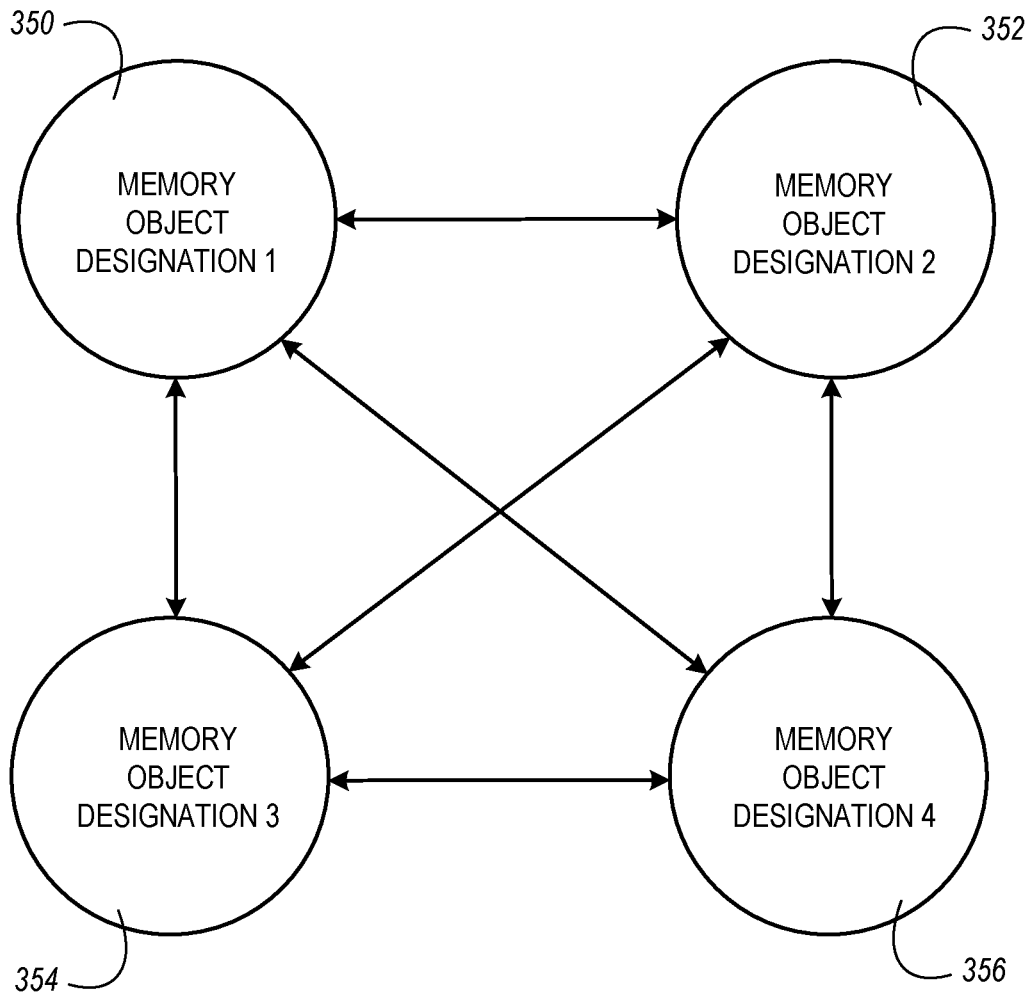
FIG. 3 is a block diagram representing memory objects in accordance with a number of embodiments of the present disclosure.

FIG. 3 is a block diagram representing memory objects in accordance with a number of embodiments of the present disclosure. As shown in FIG. 3, memory objects may be assigned a respective designation, i.e. a first designation 350, a second designation 352, a third designation 354, or a fourth designation 356. In other words, a memory object may have one of four states.

The first designation 350 and the second designation 352 may be referred to as generally "hot", while the third designation 354 and the fourth designation 356 may be referred to as generally "cold". However, the four designations provide that, in additional to general references of "hot" and "cold", sub-references can be provided for further distinguishment. For instance, the first designation 350 may be considered "hot/hot", the second designation 352 may be considered "hot/cold", the third designation 354 may be considered "cold/hot", and the fourth designation may be considered "cold/cold". As such, the first designation 350 may be considered to be more hot than the second designation 352, and both the first designation 350 and the second designation 352 may be considered to be more hot than either the third designation 354 or the fourth designation 356. Similarly, the fourth designation 356 may be considered to be more cold than the third designation 354, and both the fourth designation 356 and the third designation 354 may be considered to be more cold than either the second designation 352 or the first designation 350.

As mentioned, memory objects may be assigned a respective designation based upon a first characteristic set and a second characteristic set.

Embodiments provide that the first characteristic set can include one or more characteristics including, but not limited to, access frequency, size of the memory object, and an amount of large sequential write traffic versus an amount of small non-sequential write traffic. Characteristics of the first characteristic set can be weighted differently. Weighting of the characteristics of the first characteristic set can change, e.g., with changing workloads, benchmarks, and/or behavior of the host. Characteristics of the first characteristic set can be referred to as short-term characteristics, as compared to characteristics of the second characteristic set.

Access frequency indicates how often an associated address space is accessed during a particular time interval. Embodiments provide that for the first characteristic set the particular time interval is smaller, i.e., a shorter time passage, as compared to time intervals for the second characteristic set. The particular time interval can have various values, e.g., for different applications. As an example, the particular time interval may be 5 microseconds, 10 microseconds, 1 second, or 1 minute, among other values. Further, embodiments provide that the particular time interval may change over time, e.g., based upon changing workloads, benchmarks, and/or the host data traffic behavior, for instance. Generally, a greater access frequency will make a memory object more hot, as compared to another memory object having a lesser access frequency. In other words, a memory objects the greatest access frequency will generally have the first designation 350 and memory objects the least access frequency will generally have the fourth designation 356. Memory objects having the second designation 352 will generally have a lesser access frequency as compared to memory objects having the first designation 350. Memory objects having the second designation 352 will generally have a greater access frequency as compared to memory objects having the third designation 354. Memory objects having the third designation 354 will generally have a lesser access frequency as compared to memory objects having the second designation 352. Memory objects having the third designation 354 will generally have a greater access frequency as compared to memory objects having the fourth designation 356.

As mentioned, the first characteristic set can include size of the memory object. The size of the memory object can correspond to a quantity of bits or other information contained within the memory object. Generally, a smaller size will make a memory object more hot, as compared to another memory object having a greater size. In other words, memory objects having the smallest size will generally have the first designation 350 and memory objects having the largest size will generally have the fourth designation 356. Memory objects having the second designation 352 will generally have a larger size as compared to memory objects having the first designation 350. Memory objects having the second designation 352 will generally have a smaller size as compared to memory objects having the third designation 354. Memory objects having the third designation 354 will generally have larger size as compared to memory objects having the second designation 352. Memory objects having the third designation 354 will generally have a smaller size as compared to memory objects having the fourth designation 356.

As mentioned, the first characteristic set can include an amount of large sequential write traffic versus an amount of small non-sequential write traffic. In other words, memory objects that have a greater amount of small non-sequential write traffic will generally be more hot, as compared to another memory objects that have a greater amount of large sequential write traffic, i.e. memory object that are sequentially or serially accessed. In other words, memory objects that have greater amounts of small non-sequential write traffic will generally have the first designation 350 and memory objects that have greater amounts of large sequential write traffic will generally have the fourth designation 356. Memory objects having the second designation 352 will have a lesser amount of small non-sequential write traffic than memory objects having the first designation 350. Memory objects having the second designation 352 will generally have a greater amount of small non-sequential write traffic than memory objects having the third designation 354. Memory objects having the third designation 354 will generally have a greater amount of large sequential write traffic than memory objects having the second designation 352. Memory objects having the third designation 354 will generally have a lesser amount of large sequential write traffic than memory objects having the fourth designation 356.

Embodiments provide that the second characteristic set can include one or more characteristics including, but not limited to, access frequency, number of error corrections, and read/write disturbs. Characteristics of the second characteristic set can be weighted differently. Weighting of the characteristics of the second characteristic set can change, e.g., with changing workloads, benchmarks, and/or host data traffic patterns. Characteristics of the second characteristic set can be referred to as long-term characteristics, as compared to characteristics of the first characteristic set, which can be referred to as short-term characteristics. One or more embodiments provide that the second characteristic set is determined during a lifetime of a device.

For the second characteristic set, access frequency is monitored during a time interval that is larger than access frequency time interval for the first characteristic set. For instance, as mentioned for the second characteristic set the access frequency may be during a lifetime of a device. Generally, a lower access frequency during the relatively longer time interval will make a memory object more cold, as compared to another memory object having a lesser access frequency during the relatively longer time interval. "Cold," as used herein, means that a particular memory object has not been accessed for a long duration relative to other memory objects read from a memory device. In other words, memory objects having the lowest access frequency during the relatively longer time interval will generally have the fourth designation 356.

Generally, fewer error corrections during the relatively longer time interval will make a memory object more hot, as compared to another memory object having more error corrections during the relatively longer time interval. "Hot," as used herein, means that a particular memory object has been accessed frequently relative to other memory objects read from a memory device. In other words, memory objects having fewer error corrections during the relatively longer time interval will generally have the first designation 350 or the second designation 352, while memory objects having more error corrections during the relatively longer time interval will generally have the fourth designation 356 or the third designation 354.

Generally, fewer read/write disturbs during the relatively longer time interval will make a memory object more hot, as compared to another memory object having more read/write disturbs during the relatively longer time interval. In other words, memory objects having fewer read/write disturbs during the relatively longer time interval will generally have the first designation 350 or the second designation 352, while memory objects having more read/write disturbs during the relatively longer time interval will generally have the fourth designation 356 or the third designation 354. Read/write disturbs are errors that respectively refer to read and write voltages of unread cells being affected by read operations and/or write operations to other cells.

Embodiments provide that one or more performance characteristic sets may be monitored for each memory device. The performance characteristic set may include various parameters and/or statuses associated with a memory device. These parameters and/or statuses may vary over time. These parameters and/or statuses may include access speed, a number of uncorrectable errors associated with a memory device, and/or a number of program/erase cycles associated with the memory device, which may increase over time leading to degradation of the memory device. These parameters and/or statuses may include status checks of cards, e.g., memory devices, chips, or other circuitries, and/or status checks of registers, e.g., data structures storing memory addresses and/or memory locations associated with data retrieval and storage of data in a memory device, which may change over time based on varying conditions and/or implementations.

Monitoring the performance characteristic set for each memory device can provide a hierarchical organization of storage blocks. For instance, the monitored performance characteristic set may be utilized to rank storage blocks in terms of speed and/or health, e.g., performance. The speed and/or health, and thus the performance, of storage blocks may change over time. Storage block health may be indicated by remaining service life, e.g., where a relatively greater (longer) remaining service life indicates more health, as compared to a relatively lesser (shorter) remaining service life. Monitoring the performance characteristic set can include incrementing a counter and/or a register, e.g., such that characteristics may be documented and/or recorded for comparison.

Further, the hierarchical organization of storage blocks can be utilized for performing or refraining from performing a media management operation involving at least one memory object based, at least in part, on the upon the first characteristic set, the second characteristic set, and the performance characteristic set. For instance, various data protection and recovery schemes applied to different storage blocks. As an example, when a media management operation is performed, relatively faster and/or healthier storage blocks may utilize a first data protection and recovery scheme while relatively slower and/or less healthy storage blocks may utilize a second data protection and recovery scheme that is different from the first data protection and recovery scheme. Performing or refraining from performing a media management operation may enhance computing resource allocation and/or power consumption, for instance. As an example, when a media management operation is performed, relatively faster and/or healthier storage blocks may utilize a number of error code correction (ECC) operations, while relatively slower and/or less healthy storage blocks may utilize Redundant Array of Independent NAND (RAIN).

One or more embodiments of the present disclosure provide that performing a media management operation involving at least one memory object occurs in response to a determination that the first characteristic set, the second characteristic set, and the performance characteristic set associated with the memory object are each less than a threshold value. The threshold value can have various values, e.g., for different applications. The threshold value can change over time, e.g., increase or decrease. One or more embodiments of the present disclosure provide for refraining from performance of a media management operation involving at least one memory object occurs in response to a determination that the first characteristic set, the second characteristic set, and the performance characteristic set associated with the memory object are each greater than the threshold value.

Embodiment of the present disclosure provide that memory objects may be written to particular respective locations, e.g. storage blocks, based, at least in part, upon the first characteristic set, the second characteristic set, and the performance characteristic set.

As mentioned, memory objects having the first designation 350, which may be considered to be "hot/hot", are more hot than memory objects having the second designation 352, the third designation 354, or the fourth designation 356. As such, embodiments provide that memory objects having the first designation 350 are written to particular respective locations that have greater performance, e.g., greater access speed and/or health, than other particular respective locations that memory objects having the second designation 352, the third designation 354, or the fourth designation 356 are written to.

Memory objects having the second designation 352, which may be considered to be "hot/cold", are more hot than memory objects having the third designation 354 or the fourth designation 356. As such, embodiments provide that memory objects having the second designation 352 are written to particular respective locations that have greater performance, e.g., greater access speed and/or health, than other particular respective locations that memory objects having the third designation 354 or the fourth designation 356 are written to.

Memory objects having the third designation 354, which may be considered to be "cold/hot", are more hot than memory objects having the fourth designation 356. As such, embodiments provide that memory objects having the third designation 354 are written to particular respective locations that have greater performance, e.g., greater access speed and/or health, than other particular respective locations that memory objects having the fourth designation 356 are written to.

Memory objects having the fourth designation 356, which may be considered to be "cold/cold", are less hot than memory objects having the first designation 350, the second designation 352, and the third designation 354. As such, embodiments provide that memory objects having the fourth designation 356 are written to particular respective locations that have lesser performance, e.g., less access speed and/or health, than other particular respective locations that memory objects having the first designation 350, the second designation 352, and the third designation 354 are written to. One or more embodiments provide that memory objects having the third designation or the fourth designation may be written to a single-level cell (SLC) media.

Embodiments provide that memory objects may change designations over time. Over time, the first characteristic set and/or the second characteristic set associated with a memory object may change. In other words, over time one or more characteristics associated with a memory object may change. For instance, the access frequency of a memory object over a short-term time interval may decrease over time. This decrease in access frequency may contribute to that memory object becoming less hot, as compared to the memory object prior to the decrease in access frequency. As such, this decrease can result in the memory objects changing designation. As an example, if the memory object initially had the first designation 350, after the decrease in access frequency of the memory object, the memory object may be assigned the second designation 350. Further, as memory objects having the second designation 352 are considered less hot than memory objects having the first designation 350, the memory objects having the second designation 352, e.g., the memory object that changed designations, will be written to a particular respective location that has lesser performance, e.g., less access speed and/or health, as compared to where the memory object was written while having the first designation 350.

Similarly, if a memory object initially had the second designation 352, after an increase in access frequency of the memory object during a short-term time interval, the memory object may be assigned the first designation 350, for instance. Further, as memory objects having the first designation 350 are considered more hot than memory objects having the second designation 352, the memory objects having the first designation 350, e.g., the memory object that changed designations, will be written to a particular respective location that has greater performance, e.g., more access speed and/or health, as compared to where the memory object was written while having the second designation 352.

As shown in FIG. 3, memory objects can change designation between any of the first designation 350, the second designation 352, the third designation 354, and the fourth designation 356. A memory object having the first designation 350 can change designation, e.g., as the first characteristic set and/or the second characteristic set associated with the memory object changes over time, to have the second designation 352, the third designation 354, or the fourth designation 356. As such the memory object having a changed designation will be written to a particular respective location that has lesser performance, e.g., less access speed and/or health, as compared to where the memory object was written while having the first designation 350.

A memory object having the second designation 352 can change designation, e.g., as the first characteristic set and/or the second characteristic set associated with the memory object changes over time, to have the first designation 350, the third designation 354, or the fourth designation 356. Accordingly, the memory object having a changed designation will be written to a particular respective location that has different performance, e.g., different access speed and/or health, as compared to where the memory object was written before having the changed designation.

A memory object having the third designation 354 can change designation, e.g., as the first characteristic set and/or the second characteristic set associated with the memory object changes over time, to have the first designation 350, the second designation 352, or the fourth designation 356. Accordingly, the memory object having a changed designation will be written to a particular respective location that has different performance, e.g., different access speed and/or health, as compared to where the memory object was written before having the changed designation.

A memory object having the fourth designation 356 can change designation, e.g., as the first characteristic set and/or the second characteristic set associated with the memory object changes over time, to have the first designation 350, second designation 352, or the third designation 354. As such the memory object having a changed designation will be written to a particular respective location that has greater performance, e.g., more access speed and/or health, as compared to where the memory object was written while having the fourth designation 356.

Embodiments provide that memory objects may be combined. Memory objects having the same designation may be combined to form a different memory object. Memory objects having the different designations may be combined to form a different memory object. Memory objects that are formed by combining two or more other memory objects will have designations based upon the first characteristic set and the second characteristic set for the formed memory object. Generally, larger memory objects, e.g., memory objects that are formed by combining two or more other memory objects, will be less hot than smaller memory objects. Accordingly, the memory object formed by combining two or more other memory objects may be written to a particular respective location that has different performance, e.g., different access speed and/or health, as compared to where the two or more other memory objects were written before being combined.

Embodiments provide that memory objects may be separated. Memory objects having the same designation may be separated to form a different memory object. Memory objects that are formed by separating two or more other memory objects will have designations based upon the first characteristic set and the second characteristic set for the formed memory object. Generally, smaller memory objects, e.g., memory objects that are formed by separating two or more other memory objects, will be more hot than larger memory objects. Accordingly, the memory object formed by separating two or more other memory objects may be written to a particular respective location that has different performance, e.g., different access speed and/or health, as compared to where the two or more other memory objects were written before being separated.

Figure 4:
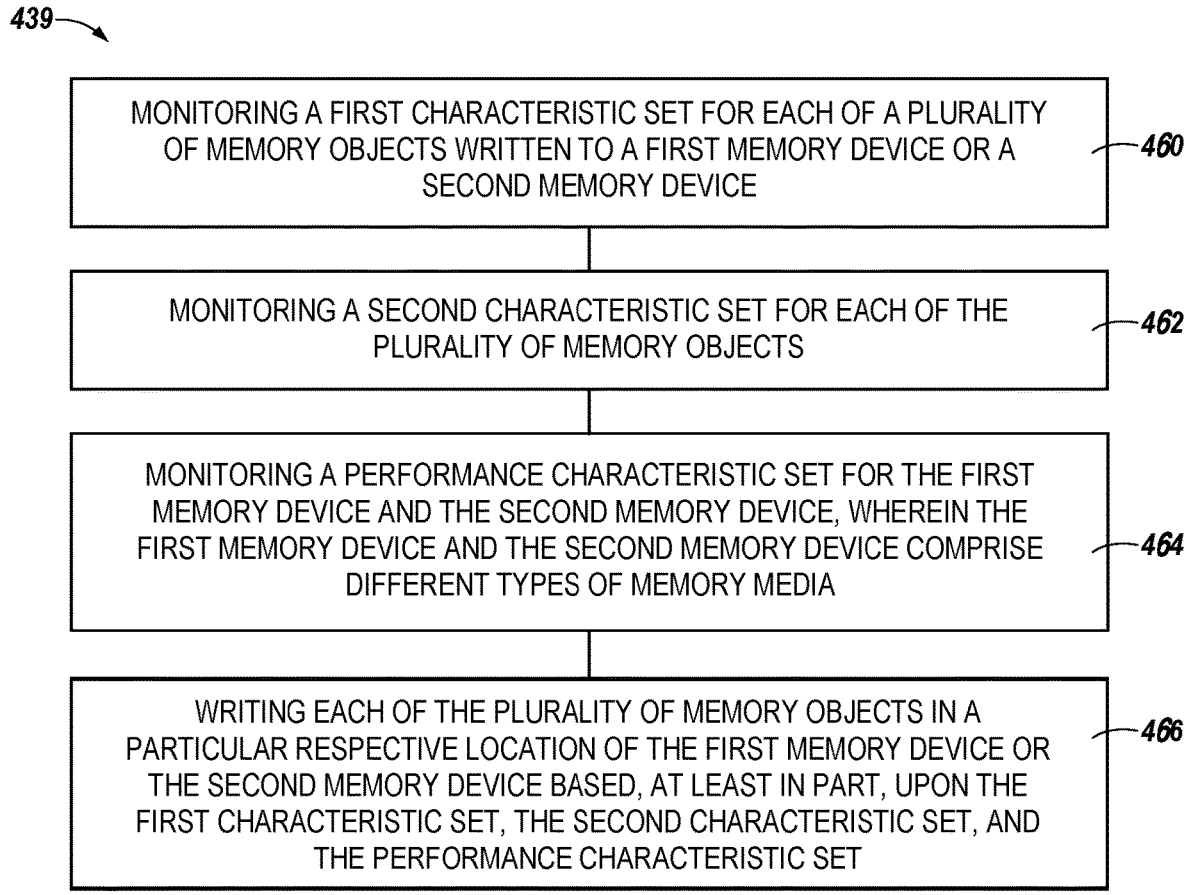
FIG. 4 is a flow diagram representing an example method for managing memory objects in accordance with a number of embodiments of the present disclosure.

FIG. 4 is a flow diagram representing an example method for managing memory objects in accordance with a number of embodiments of the present disclosure. The method 439 can be performed by processing logic that can include hardware, e.g., processing device, circuitry, dedicated logic, programmable logic, microcode, hardware of a device, integrated circuit, etc., software, e.g., instructions run or executed on a processing device, or a combination thereof. In some embodiments, the method 439 is performed by the controller 110 illustrated in FIG. 1. In some embodiments, the method 439 is performed by the control circuitry 213, 215, 217 illustrated in FIG. 2. In some embodiments, the method 439 is performed by the controller 210 and control circuitry 213, 215, 217 illustrated in FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 460, the method 439 can include monitoring a first characteristic set for each of a plurality of memory objects written to a first memory device or a second memory device.

At block 462, the method 439 can include monitoring a second characteristic set for each of the plurality of memory objects.

At block 464, the method 439 can include monitoring a performance characteristic set for the first memory device and the second memory device, wherein the first memory device and the second memory device comprise different types of memory media.

At block 466, the method 439 can include writing each of the plurality of memory objects in a particular respective location of the first memory device or the second memory device based, at least in part, upon the first characteristic set, the second characteristic set, and the performance characteristic set.

In some embodiments, the first characteristic set comprises a respective access frequency for each of the plurality of memory objects during a first time interval; and the second characteristic set comprises a respective access frequency for each of the plurality of memory objects during a second time interval, wherein the second time interval is larger than the first time interval.

In some embodiments, the method 439 can include assigning each of the plurality of memory objects a respective designation based upon the first characteristic set and the second characteristic set, wherein the respective designation is selected from a first designation, a second designation, a third designation, and a fourth designation.

In some embodiments, the method 439 can include combining a first memory object having the first designation and a second memory object having the first designation to form a third memory object having the second designation, the third designation, or the fourth designation.

In some embodiments, the method 439 can include writing the third memory object having the second designation, the third designation, or the fourth designation in a particular location of the plurality of memory media that has a slower access time than either particular respective location of the plurality of memory media that the first memory object having the first designation or the second memory object having the first designation were written to before the combining.

In some embodiments, the method 439 can include writing the third memory object having the second designation, the third designation, or the fourth designation in a particular location of the plurality of memory media that has a lesser remaining service life than either particular respective location of the plurality of memory media that the first memory object having the first designation or the second memory object having the first designation were written to before the combining.

In some embodiments, the method 439 can include separating a first memory object having the fourth designation to form a second memory object having the first designation, the second designation, or the third designation and a third memory object having the first designation, the second designation, or the third designation.

In some embodiments, the method 439 can include writing the second memory object having the first designation, the second designation, or the third designation and the third memory object having the first designation, the second designation, or the third designation in particular respective locations of the plurality of memory media that each have a faster access time than the particular respective location of the plurality of memory media that the first memory object having the fourth designation was written to before the separating.

In some embodiments, the method 439 can include writing the second memory object having the first designation, the second designation, or the third designation and the third memory object having the first designation, the second designation, or the third designation in particular respective locations of the plurality of memory media that each have a greater remaining service life than the particular respective location of the plurality of memory media that the first memory object having the fourth designation was written to before the separating.

In some embodiments, a memory object having the first designation is written to a first type of memory media and a memory object having the fourth designation is written to a second type of memory media.

In some embodiments, the method 439 can include performing or refraining from performing a media management operation involving at least one memory object based, at least in part, on the upon the first characteristic set, the second characteristic set, and the performance characteristic set.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
monitoring a first characteristic set for each of a plurality of memory objects written to a first memory device or a second memory device;
monitoring a second characteristic set for each of the plurality of memory objects;
monitoring a performance characteristic set for the first memory device and the second memory device, wherein the first memory device and the second memory device comprise different types of memory media;
writing each of the plurality of memory objects in a particular respective location of the first memory device or the second memory device based, at least in part, upon the first characteristic set, the second characteristic set, and the performance characteristic set;
assigning each of the plurality of memory objects a respective designation based upon the first characteristic set and the second characteristic set, wherein the respective designation is selected from a first designation, a second designation, a third designation, and a fourth designation; and
combining a first memory object having the first designation and a second memory object having the first designation to form a third memory object having the second designation, the third designation, or the fourth designation.

2. The method of claim 1, wherein:
the first characteristic set comprises a respective access frequency for each of the plurality of memory objects during a first time interval; and
the second characteristic set comprises a respective access frequency for each of the plurality of memory objects during a second time interval, wherein the second time interval is larger than the first time interval.

3. The method of claim 1, further comprising:
writing the third memory object having the second designation, the third designation, or the fourth designation in a particular location of the plurality of memory media that has a slower access time than either particular respective location of the plurality of memory media that the first memory object having the first designation or the second memory object having the first designation were written to before the combining.

4. The method of claim 1, further comprising:
writing the third memory object having the second designation, the third designation, or the fourth designation in a particular location of the plurality of memory media that has a lesser remaining service life than either particular respective location of the plurality of memory media that the first memory object having the first designation or the second memory object having the first designation were written to before the combining.

5. The method of claim 1, further comprising:
separating a first memory object having the fourth designation to form a second memory object having the first designation, the second designation, or the third designation and a third memory object having the first designation, the second designation, or the third designation.

6. The method of claim 5, further comprising:
writing the second memory object having the first designation, the second designation, or the third designation and the third memory object having the first designation, the second designation, or the third designation in a particular respective locations of the plurality of memory media that each have a faster access time than the particular respective location of the plurality of memory media that the first memory object having the fourth designation was written to before the separating.

7. The method of claim 5, further comprising:
writing the second memory object having the first designation, the second designation, or the third designation and the third memory object having the first designation, the second designation, or the third designation in a particular respective locations of the plurality of memory media that each have a greater remaining service life than the particular respective location of the plurality of memory media that the first memory object having the fourth designation was written to before the separating.

8. The method of claim 1, wherein a memory object having the first designation is written to a first type of memory media and a memory object having the fourth designation is written to a second type of memory media.

9. The method of claim 1, further comprising performing or refraining from performing a media management operation involving at least one memory object based, at least in part, on the upon the first characteristic set, the second characteristic set, and the performance characteristic set.

10. An apparatus, comprising:
a plurality of memory devices resident on a same memory system, wherein the plurality of memory devices comprises a first type of memory media that has a faster access time than the second type of memory media; and
a controller coupled to the plurality of memory devices and resident on the same memory system, the controller configured to:
monitor a first characteristic set for each of a plurality of memory objects;
monitor a second characteristic set for each of the plurality of memory objects;
monitor a performance characteristic set for each of a plurality of memory devices, wherein at least two of the plurality of memory devices comprise different types of memory media;
write each of the plurality of memory objects in a particular respective location of the plurality of memory devices based upon the first characteristic set, the second characteristic set, and the performance characteristic set;
assign each of the plurality of memory objects a respective designation based upon the first characteristic set and the second characteristic set, wherein the respective designation is selected from a first designation, a second designation, a third designation, and a fourth designation; and
combine a first memory object and a second memory object of the plurality of memory objects to form a third memory object, wherein the third memory object is larger than the first memory object and the second memory object.

11. The apparatus of claim 10, the controller further configured to:
write the first memory object and the second memory object in the first type of memory media and write the third memory object in the second type of memory media, wherein the first memory object and the second memory object are each assigned the first designation and the third memory object is assigned the fourth memory designation.

12. The apparatus of claim 10, wherein the controller is further configured to:
cause performance of a media management operation involving the memory object in response to a determination that the first characteristic set, the second characteristic set, and the performance characteristic set associated with the memory object are each less than a threshold value; and
refrain from performance of the media management operation involving the memory object in response to a determination that the first characteristic set, the second characteristic set, and the performance characteristic set associated with the memory object are each greater than a threshold value.

13. A system, comprising:
a host;
a memory system including a memory device comprising a plurality of memory media, wherein at least two of the plurality of memory media are different types of memory media; and
a memory controller coupled to the host and the memory system to:
assign each of a plurality of memory objects a respective designation based upon a first characteristic set comprising a respective access frequency for each of the plurality of memory objects during a first time interval and a second characteristic set comprising a respective access frequency for each of the plurality of memory objects during a second time interval, wherein the second time interval is larger than the first time interval, and wherein the respective designation is selected from a first designation, a second designation, a third designation, and a fourth designation; and
write each of the plurality of memory objects in a particular respective location of the plurality of memory media based upon the first characteristic set, the second characteristic set, and a performance characteristic set, wherein a first memory object having the first designation is written to a first memory media that utilizes Error Correction Code (ECC) and a second memory object having the fourth designation is written to a second memory media that utilizes Redundant Array of Independent NAND (RAIN); and
combine the first memory object having the first designation and another memory object having the first designation to form a third memory object having the second designation, the third designation, or the fourth designation.

14. The system of claim 13, wherein the first memory media is selected from dynamic random-access memory (DRAM) and a 3-D Crosspoint (3D XP) memory.

15. The system of claim 13, wherein the first memory object has greater access frequency during the first time interval than the second memory object.

16. The system of claim 13, wherein a memory object having the third designation is written to a single-level cell (SLC) media.

17. The system of claim 13, wherein a memory object having the second designation is smaller than a memory object having the fourth designation.

18. An apparatus, comprising:
a plurality of memory devices resident on a same memory system; and
a controller coupled to the plurality of memory devices and resident on the same memory system, the controller configured to:
monitor a first characteristic set for each of a plurality of memory objects;
monitor a second characteristic set for each of the plurality of memory objects;
monitor a performance characteristic set for each of a plurality of memory devices, wherein at least two of the plurality of memory devices comprise different types of memory media;
write each of the plurality of memory objects in a particular respective location of the plurality of memory devices based upon the first characteristic set, the second characteristic set, and the performance characteristic set;
cause performance of a media management operation involving the memory object in response to a determination that the first characteristic set, the second characteristic set, and the performance characteristic set associated with the memory object are each less than a threshold value; and
refrain from performance of the media management operation involving the memory object in response to a determination that the first characteristic set, the second characteristic set, and the performance characteristic set associated with the memory object are each greater than a threshold value.

19. A method, comprising:
monitoring a first characteristic set for each of a plurality of memory objects written to a first memory device or a second memory device;
monitoring a second characteristic set for each of the plurality of memory objects;
monitoring a performance characteristic set for the first memory device and the second memory device, wherein the first memory device and the second memory device comprise different types of memory media;
writing each of the plurality of memory objects in a particular respective location of the first memory device or the second memory device based, at least in part, upon the first characteristic set, the second characteristic set, and the performance characteristic set;
assigning each of the plurality of memory objects a respective designation based upon the first characteristic set and the second characteristic set, wherein the respective designation is selected from a first designation, a second designation, a third designation, and a fourth designation; and separating a first memory object having the fourth designation to form a second memory object having the first designation, the second designation, or the third designation and a third memory object having the first designation, the second designation, or the third designation.

\* \* \* \* \*